United States Patent [19]

Muscatell

[11] 4,434,345
[45] Feb. 28, 1984

[54] MICROWAVE SYSTEM FOR FROST PROTECTION OF FRUIT TREES

[76] Inventor: Ralph P. Muscatell, 2007 NE. 20th Ave., Fort Lauderdale, Fla. 33304

[21] Appl. No.: 403,063

[22] Filed: Jul. 29, 1982

[51] Int. Cl.$^3$ ............................................. H05B 6/72
[52] U.S. Cl. ..................... 219/10.55 R; 219/10.55 F; 219/10.57
[58] Field of Search ................ 219/10.55 R, 10.55 M, 219/10.55 F, 10.57, 10.55 A

[56] References Cited

U.S. PATENT DOCUMENTS

| | | | |
|---|---|---|---|
| 3,443,051 | 6/1969 | Puschner | 219/10.57 |
| 3,461,260 | 8/1969 | Bremer | 219/10.55 |
| 4,219,715 | 8/1980 | Mandle et al. | 219/10.55 F |
| 4,256,944 | 3/1981 | Brandon | 219/10.55 |
| 4,284,868 | 8/1981 | Simpson | 219/10.55 R |
| 4,365,131 | 12/1982 | Hansman, Jr. | 219/10.55 M |

OTHER PUBLICATIONS

"Microwave Protection of Plants from Cold"; Bosisio, R. G.; Barthakur, N., Ecole Polytech., Montreal, Canada; Journal of Microwave Power (Canada); vol. 4, No. 3, pp. 190–193; Oct. 1969.

Primary Examiner—Roy N. Envall, Jr.
Assistant Examiner—M. M. Lateef
Attorney, Agent, or Firm—Oltman and Flynn

[57] ABSTRACT

A microwave system for frost protection of fruit trees and plants which utilizes a concentrated beam of microwave energy radiated from a directional microwave antenna and directed toward trees, plants and fruits in danger of freezing. The microwave energy is absorbed in the tissues of the leaves and fruits where it is converted to heat energy. In one form the antenna is mounted atop a mast from where the beam may be directed toward selected trees or plants by means of a two axis swiveling sequencer controlled by motors and control apparatus. In another form, the antenna is mounted atop an articulated two-leg boom attached to a wheeled carriage that may be self propelled or drawn and which has controls for operating the boom and for direction the antenna.

13 Claims, 11 Drawing Figures

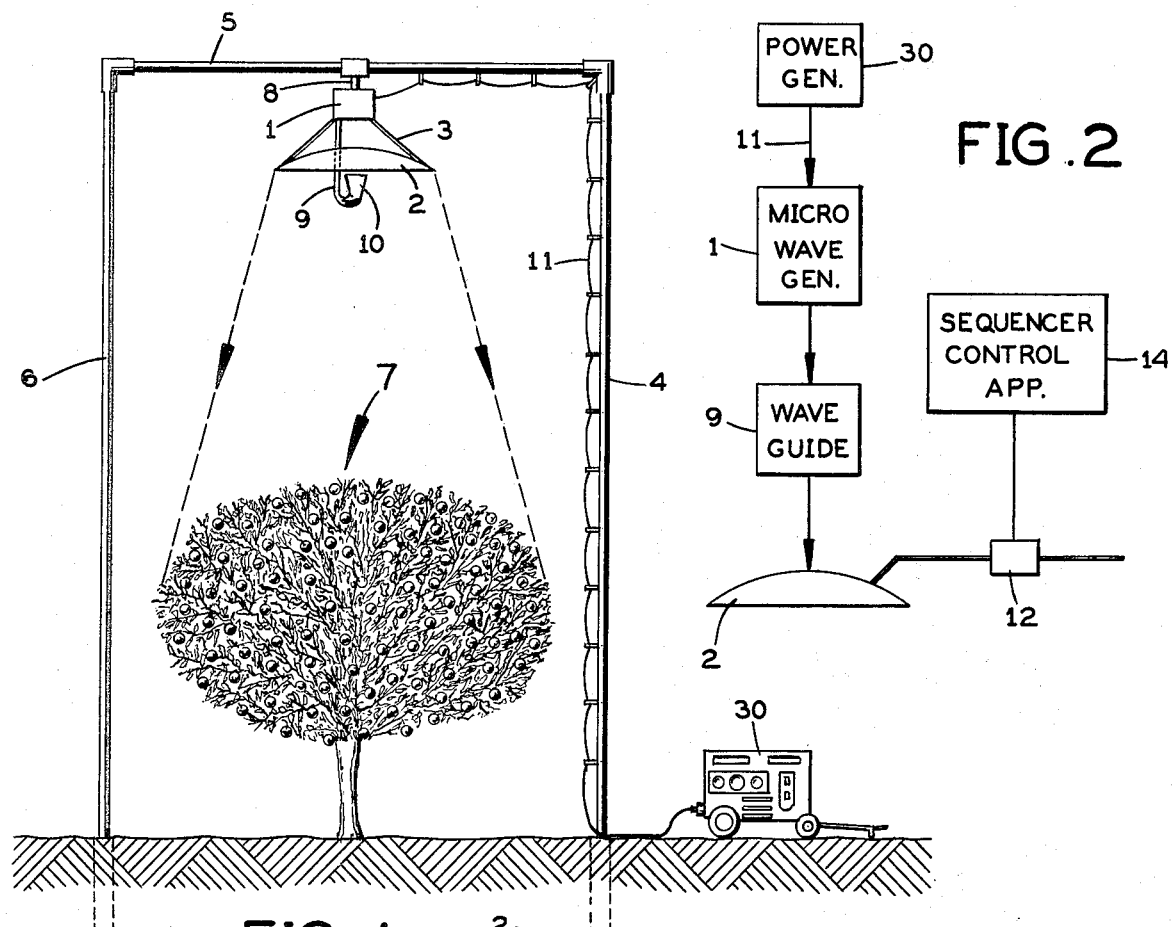
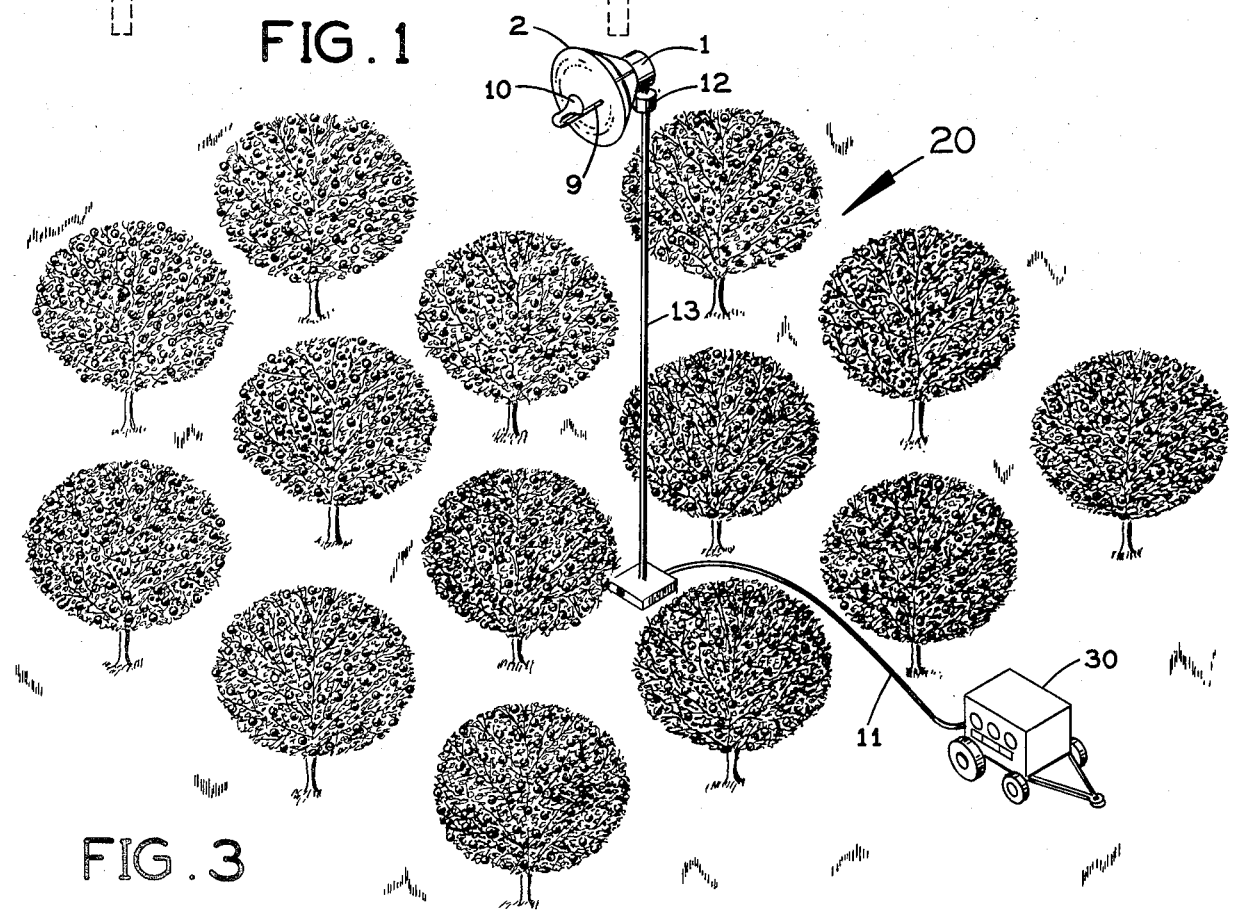

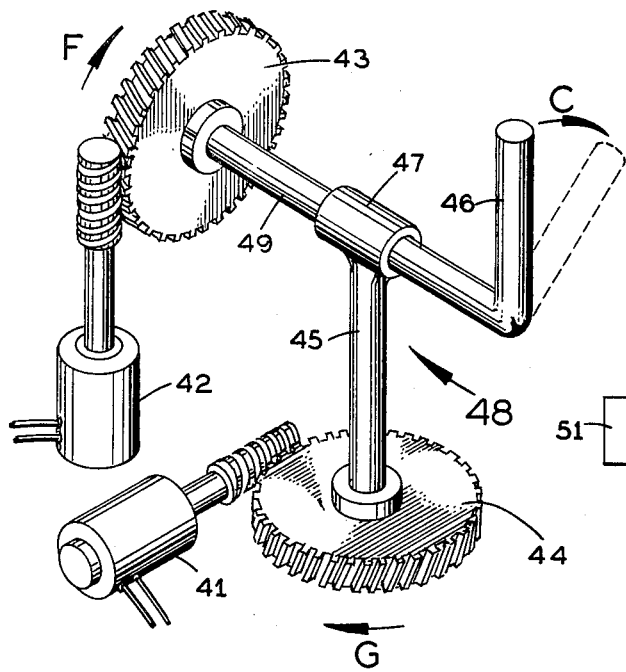
FIG. 8
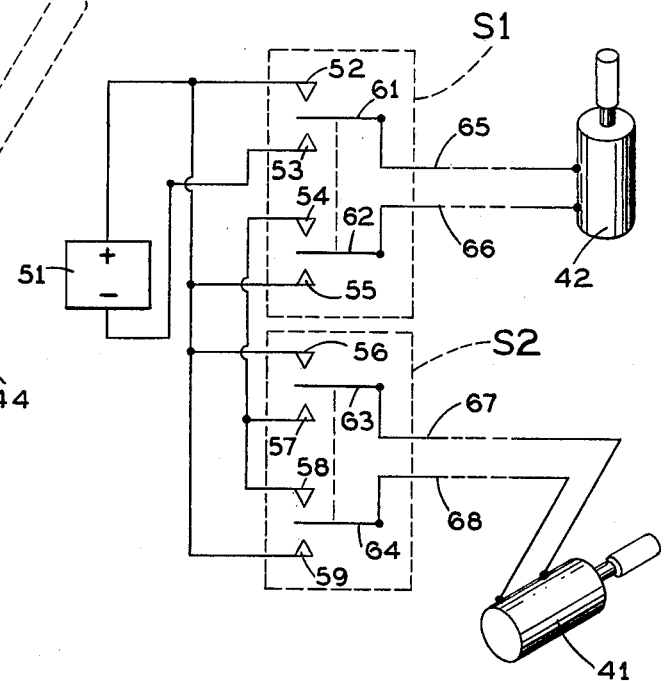
FIG. 9
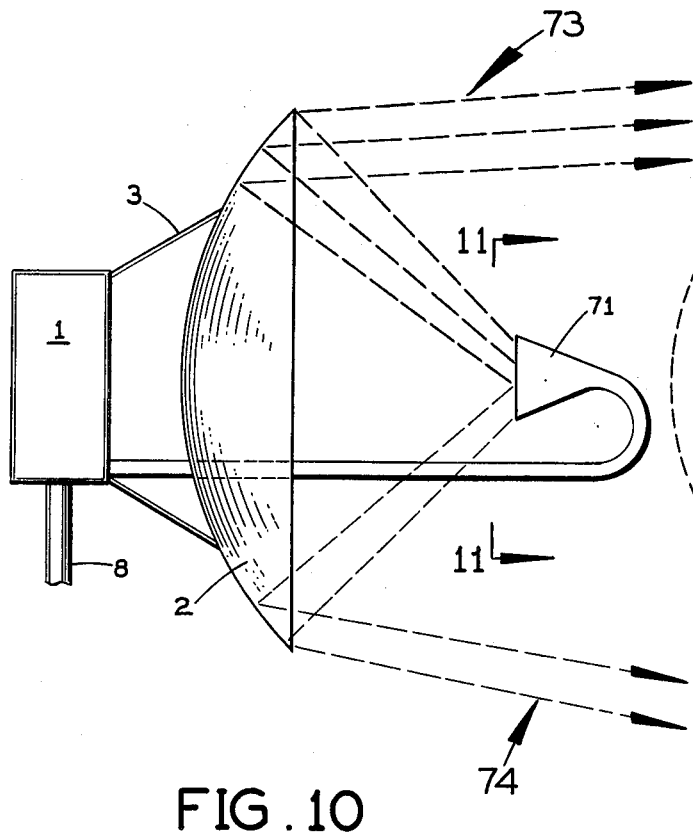
FIG. 10
FIG. 11

MICROWAVE SYSTEM FOR FROST PROTECTION OF FRUIT TREES

BACKGROUND AND PRIOR ART

Growers of fruit and vegetables in areas where occasional frost might pose a hazard to the crops are faced with the need to prevent such hazards. A number of methods for preventing or reducing crop damage from frost spells have been or are in use. Such methods employ suitable fires placed upwind from the growing area, or methods for agitating the air in the growing area with motor driven propellers mounted on masts. Such methods have the drawback of being expensive and uncertain and require bulky, space consuming equipment.

The present invention discloses a system which makes use of directed beams of electromagnetic energy that may be directed toward trees or plants that need protection.

Fields of electromagnetic energy have been known and used for heating purposes for a long time. Examples are industrial heating of materials to be joined by exposing them to an intense field of high frequency energy which due to dielectric losses in the material, causes most of the high frequency energy to be absorbed in the material and there converted into heat. Another example is the microwave oven which is now widely used for heating of food. In a microwave oven, electromagnetic energy of a very high frequency, typically in the frequency range of 0.95 to 5 gigahertz is injected into an enclosure containing the food to be heated.

U.S. Pat. No. 4,256,944 by Brandon, issued Mar. 17, 1981 describes a system for thawing bulk particulate material by means of powerful microwave beams directed toward the material to heat and thaw it.

U.S. Pat. No. 3,461,260 by Bremer, issued Aug. 12, 1969 describes a microwave oven connected to a source of microwave energy.

The present invention discloses a method for prevention of frost damage to agricultural crops by producing a beam of microwave energy that may be directed toward particular trees or areas or toward stands of fruit or vegetables.

It is well known, from the fields of physics and electromagnetic science that electromagnetic waves by suitable antennas may be concentrated and directed as beams. Normally, the larger the antenna in relation to the wavelength of the electromagnetic energy, the more narrowly the beam may be concentrated. Microwaves which generally fall in the range of wavelength from 2 to 20 centimeters can be economically concentrated into directed beams with antennas which are physically generally five or more times greater than the wavelength of the microwave energy in question. In other words, antennas that have physical dimensions greater than from 20 to 100 centimeters or greater for good directability may be employed.

It has been found by experience and analysis that reflecting antennas with the shape of a paraboloid reflector are especially well suited for use as microwave antennas.

The present invention discloses a system for frost protection of trees and plants during cold periods of time. It uses a source of microwave energy connected to a directional antenna, which may be directed toward trees or plants to generate enough heat energy in the tissue of the leaves and fruits to prevent freezing.

It is preferable to employ microwave energy of a wavelength that is absorbed to a high degree by water and the juices of plants and fruits, so that the energy is dissipated mostly in those parts of the plants. A frequency of about 3 gigahertz is believed to be useful with 3 results at about 2.45 gigahertz as seen in microwave oven technology and 1.6 gigahertz as seen in meteorological measurements.

It is therefore a major object of the present invention to provide a microwave system for frost protection of fruit trees and the like which employs a directed beam of microwave energy.

It is another major object of the invention to provide a microwave system for frost protection of fruit trees and plants that employs a directed beam of microwave energy that may be directed toward individual trees or plants under control of sequencing apparatus.

It is a further object of the invention to provide a microwave system for frost protection of fruit trees and plants, that is ambulatory so that one system may serve a larger area, or be deployed to areas that are more prone to frost damage than others.

It is a still further object of the invention to provide a microwave system for frost protection of fruit trees and plants that is economical and reliable in use.

It is still a further object of the invention to provide a microwave system for protection of fruit trees and plants that is energy efficient.

It is still another object of the invention to provide a microwave system for frost protection of fruit trees and plants that may be readily fabricated using established methods of manufacture.

BRIEF DESCRIPTION OF THE DRAWINGS

FIG. 1 is a vertical plan view of the invention installed above a fruit tree, facing downward;

FIG. 2 is a block diagram of the invention showing its major functional blocks;

FIG. 3 is a perspective view of a field of fruit trees with the invention installed atop a mast in a position to scan the fruit trees;

FIG. 8 is a perspective diagrammatic view of the main components of the sequencer;

FIG. 9 is a schematic circuit diagram of a sequencer control apparatus;

FIG. 10 is a view of another embodiment; and

FIG. 11 is a view of still another embodiment.

DETAILED DESCRIPTION OF PREFERRED EMBODIMENT

Figure 4:
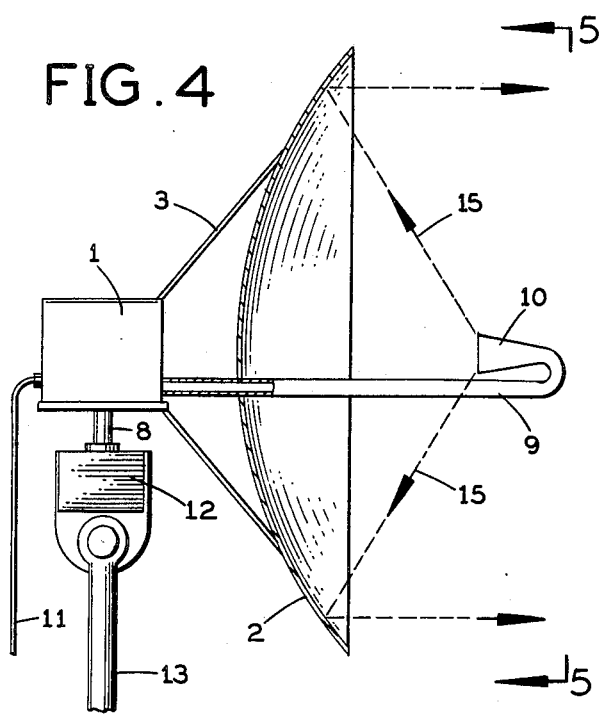
FIG. 4 is a cross-sectional view of the invention showing its major elements.

The present invention belongs to the class of apparatus that employs radio frequency energy to produce heat in an object. The invention is specifically directed to the use of radio frequency energy to prevent the hazard to agricultural crops and plants caused by freezing weather. In the following description, certain preferred embodiments are described in detail. It should be understood that the invention is capable of being used in other embodiments which may be obvious to those skilled in the art and that the drawings and description are not to be limiting but are for descriptive purposes.

FIG. 1 shows the invention installed above a fruit tree generally at 7, facing downward, so that the tree may be enveloped in the radio frequency, or more specifically, microwave energy radiated from the reflector 2 above the tree. A gantry, consisting of two columns 4 and 6 supporting at their upper ends a horizontal beam 5, disposed generally above the top of the tree, and supporting the invention, which has the reflector 2, facing downward. The reflector is attached by support rods 3 to microwave generator 1. The microwave generator contains apparatus consisting of components constructed to convert primary power such as DC-power from a power generator 30 into microwave energy of a suitable wavelength, generally in the range from 2 to 20 centimeters. A power cable 11 serves to connect primary power from the power generator 30 to the microwave generator.

The gantry consisting of the vertical columns 4 and 6 supporting the beam 5 is shown as a stationary structure. It should be understood however that there are many other ways to position the invention, some of which will be described in the following specification.

FIG. 2 shows a block diagram of the major functional building blocks of the invention. It shows a power generator 30 connected through power cable 11 to microwave generator 1 which in turn connects microwave energy to a waveguide 9 which feeds microwave energy to a horn (not shown) disposed at the focal point of the parabolic reflector 2. A sequencer 12 mechanically supports the parabolic reflector 2 and is capable of turning the reflector about a vertical axis so that its beam can rotate to any direction in a horizontal plane through the sequencer. The sequencer is also capable of rotating the beam up and down in a vertical plane. The sequencer 12 is controlled by sequencer control apparatus 14, which contains the components required to direct two electric motors contained in the sequencer 12 to perform the vertical and horizontal rotations described above.

The power generator 30 provides the primary power required to power the system according to the present invention. It may be driven by any suitable type engine, preferably a lightweight internal combustion engine coupled to an electric generator which produces electric power in the voltage and amperage range required by the microwave generator 1, the sequencer 12 and the sequencer control apparatus 14.

Figure 7:
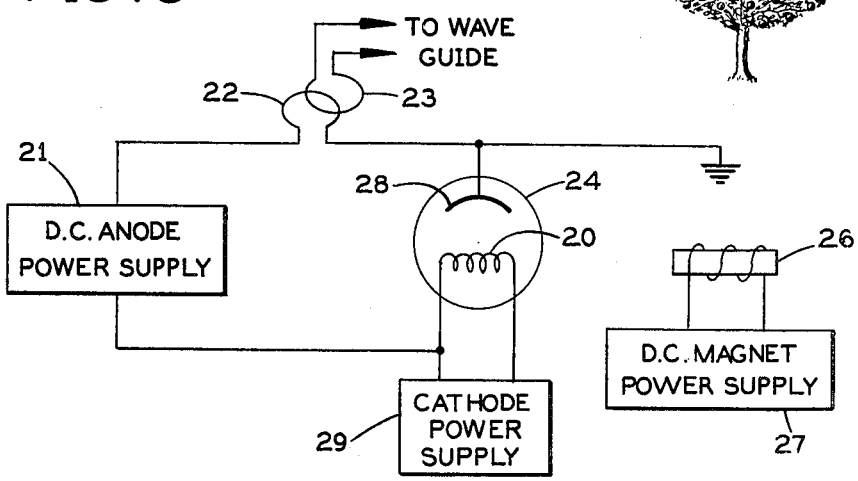
FIG. 7 is a schematic circuit diagram of a microwave generating circuit.

The microwave generator 1 contains the components required for the generation of high power microwave energy. Such generators have been known and used in the art of microwave transmission, radar system and microwave heating systems for several years. Most such systems are based on the use of a magnetron tube. Such tubes are available that produce microwave power in the range of many kilowatts of radio frequency power. A typical circuit of this type is shown in FIG. 7. A magnetron tube 24 has an anode 28 and a filament-cathode 20. A DC anode power supply 21 provides the input power to the tube 24. The DC voltage may typically be in the range from 5 to 15 thousand volts and the current may typically be in the range from 1 to 3 amperes. A filament-cathode 20 is supplied with AC power from a cathode power supply 29 in order to heat it to its operating temperature. Power to the filament is typically in the range of 12 volts and 30–100 amperes.

Figure 5:
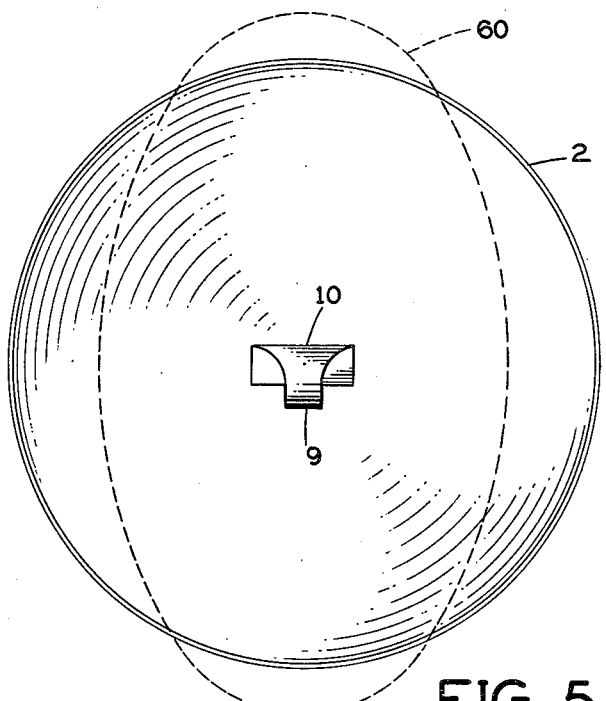
FIG. 5 is a vertical view of the invention seen along the line 5—5 of FIG. 4.

An electromagnet 26 is powered by a DC magnet power supply 27 which produces a strong magnetic field between the anode and the cathode to produce the microwave oscillation in the anode circuit. An inductor 22 is coupled inductively to a take-up winding 23 which is, in turn, connected to the input opening of the waveguide 9 (FIG. 4). The waveguide 9 is typically configured as a hollow tube constructed from copper or aluminum or other highly conductive metal. The waveguide has a rectangular cross-section which serves to guide the microwave energy through the tube. FIG. 4 and FIG. 5 show in more detail the reflector 2 attached by support rods 3 to the microwave generator. The waveguide 9 extends from the microwave generator 1 through the shell of the parabolic reflector 2 in a generally horizontal direction to its outermost point where it is bent in a U-shape and pointing back toward the reflector. At that point the waveguide is flared out to form a horn 10. The mouth of the horn is placed at the focal point of the parabolic reflector, from where the microwave energy radiates in a pattern as a wide open cone toward the inner concave surface of the reflector. In such a case as is well known from the sciences of microwave physics, the reflector will re-transmit the microwave energy in a beam of microwave energy along the axis of the parabolic reflector as shown by the dotted lines 15 representing two imaginary rays of microwave energy. Depending upon the position of the horn 10 in relation to the reflector the beam may be highly concentrated for projection to remote points or divergent when directed to nearby points. If the horn is positioned with its mouth exactly at the focal point of the reflector, the reflected beam will be highly concentrated, and if the horn is positioned in the axis of the reflector, but off-set from the focal point a certain distance, the beam will be divergent to a degree that is generally proportional to the distance from the focal point to the point of offset.

Whenever that beam of selected frequency strikes a fruit tree or a plant, the tissues of the tree or plant including leaves and fruits will be heated by dielectric heating of the tissues due to the presence of moisture, and it follows that frost damage to the tissues may be averted.

Returning now to FIG. 2, the sequencer 12 as described above, serves to rotate the antenna about a vertical and a horizontal axis so as to direct the microwave beam in any desired direction.

FIG. 8 shows in diagrammatic form, the major components of the sequencer. A horizontally oriented electric motor 41 with its shaft attached to a worm gear which engages a horizontally oriented gearwheel 44, serves to turn said gearwheel about its vertical shaft 45. The shaft 45 supports, at its upper end a unitary assembly, generally at 48, which consists of a bearing 47, supporting a horizontal shaft 49 with a vertically oriented gearwheel 43. Gearwheel 43, in turn, engages a worm gear attached to the shaft of a second vertically oriented electric motor 42. The shaft 49 supports an arm 46, which when the motor 42 is turning describes a circle in a vertical plane. The reflector 2 is rigidly attached to the arm 46 and follows its movements. The motor 41, when it turns, rotates the entire unitary assembly, generally at 48. It follows, that the two motors 41 and 42 in combination serve to orient the reflector to any desired position.

The motors 41 and 42 are operated under control of the sequencer control apparatus 14 in FIG. 2. The sequencer control apparatus contains switch means consisting of switches that may connect power to either motor 41 or 42 to operate it in its forward or reverse direction of rotation. In its simplest form the switch means contains two manually operated toggle switches S1 and S2 in FIG. 9. Each switch has two transfer contacts 61 and 62 of S1 and 63 and 64 of S2. When not operated each switch stays in its normal neutral center position.

When either switch is operated to its upper position, contacts 52 will connect with 61, 54 and 62, or contacts 56 with 63 and 58 with 64. In this position of S1 motor 42 will have positive potential on lead 65 from the power supply 51, and negative potential on lead 66, which will cause the motor to turn in its forward direction as indicated by arrow F at gearwheel 43 in FIG. 8. If the switch S1 is operated to its lower position the opposite potential will be applied to the motor 42 through contacts 53 and 61, and 55 and 62 which will cause the motor to turn in its reverse direction. If the motor 42 has been powered in its forward direction for a short time, the arm 46 in FIG. 8 will rotate in the clockwise direction as indicated by an arrow C to a new position as indicated in broken lines.

The other switch S2 serves to operate the motor 41 in a similar manner as described for motor 42 above. In its upper position of S2 lead 67 will be connected to positive potential through contacts 56 and 63, and lead 68 will be connected to negative potential through contacts 58 and 64, and the motor will turn in its forward direction to turn gearwheel 44 in its forward direction indicated by arrow G. In its lower position, switch S2 will connect the opposite potentials to motor 41 through contacts 57 and 63, and 59 and 64, causing it to turn in the reverse direction.

More complex sequencer control apparatus may be constructed which includes automatic control circuits which automatically direct the beam of microwave energy to pre-selected directions. Such circuitry would preferably be connected to limit switches for the positions of the gear wheels 43 and 44 such that a scanning or stepping motion may be used to drive said gearwheels. Still more complex control apparatus may include automatic temperature sensing devices to automatically start the control apparatus if the air temperature should fall below a pre-selected temperature.

OTHER EMBODIMENTS

Figure 6:
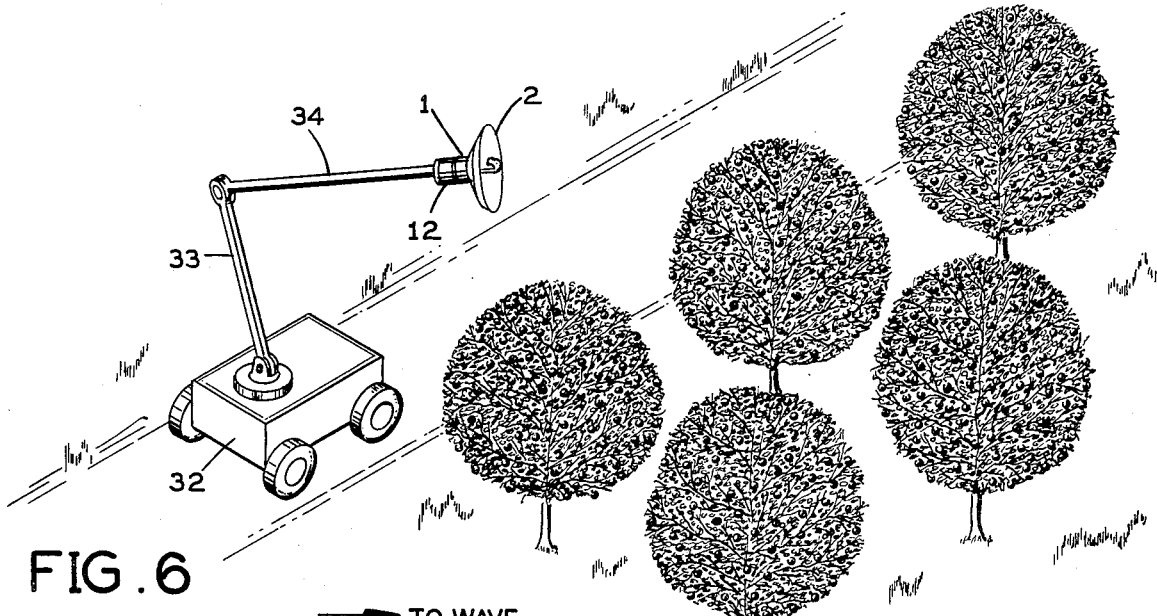
FIG. 6 is a perspective view of the invention installed in an ambulatory embodiment atop articulated booms.

Another embodiment of the present invention includes a wheeled carriage on which the microwave system is installed to form an ambulatory system, as shown on FIG. 6.

In this embodiment, 32 is a wheeled carriage, either self propelled or drawn by a tractor. On top of the carriage, an articulated, hydraulically operated first boom 33, is pivotally attached thereto. Said first boom connects through pivotable linkage to one end of a second articulated boom 34, which at its other end is connected to an assembly consisting of a sequencer 12, connected to a microwave generator 1 attached to the reflector 2. The hydraulic booms may be manipulated by suitable manual or automatic controls to manipulate and direct the reflector and the beam of microwave energy toward areas that need to be protected against frost damage.

In still another embodiment, the reflecting antenna is configured with a curvature that deviates from a true paraboloid, such that the reflected beam is shaped like a spread fan, disposed in a vertical plane, in other words, the beam is dispersed in a vertical plane defined by the axis of the reflector but concentrated when projected onto a plane that is perpendicular to the axis of the reflector. A reflector of this type may be shaped like a vertically oriented ellipsoid. The ellipsoid reflector may further be tilted a small angle downward from the horizontal plane. The ellipsoid reflector will have a shape generally as shown by the broken line 60 in FIG. 5. The invention, according to this embodiment would preferably be rotated about a vertical axis, within selected radii from the axis, so that a sector of land will be covered by the beam in consecutive sweeps. In a special case, the aforesaid radii may be 360 degrees apart, so that said sector may be a complete circle. FIG. 3 shows such an application of the invention, wherein a field of fruit trees is being swept by the beam.

In still another embodiment, the microwave reflector with its wave guide and horn is configured such that the reflected beam has a greater energy density in the upper part of the beam than in the lower part.

FIG. 10 and FIG. 11 show such an arrangement. The reflector 2 is parabolic as described above, but the mouth of the horn 71, instead of being rectangular as described above is trapezoid with the long side 75 above the short side 76. With the upper part of the mouth of the horn which feeds the upper part of the reflector having a greater area a higher density of the upper part 73 of the beam than of the lower part 74 is attained. This arrangement has the advantage that the more distant part of the fruit trees and plants to be heated receive a greater portion of the radiated energy than the near part of the trees, which results in a more uniform heating of the entire area.

In a somewhat different version of the foregoing embodiment, the reflector 2 in FIG. 11 has its upper part removed along the sector 72 shown in dotted line. With this arrangement the horn 71 is positioned such that no energy is radiated to the area above the sector 72. By this means no microwave energy is wasted on very distant areas where the benefit of the heating would be without merit.

I claim:

1. A microwave system for frost protection of fruit trees and plants comprising:
    a source of microwave energy;
    a directional, directable microwave antenna;
    said source of microwave energy and said directional, directable microwave antenna physically forming a unitary assembly;
    means for transmitting microwave energy from said source of microwave energy to said microwave antenna;
    means for directing said directional, directable microwave antenna;
    a source of primary energy;
    means for conducting said primary energy to said source of microwave energy; and
    means for structural support of said directional, directable microwave antenna.

2. A microwave system for frost protection of fruit trees and plants as defined in claim 1, wherein:
    said source of microwave energy comprises a magnetron tube;
    an electromagnet to provide a magnetic field for said magnetron tube;
    means for supplying electrical energy for said magnetron tube and said electromagnet;

means for extracting microwave energy from said magnetron tube; and means for encasing said source of microwave energy.

3. A microwave system for protection of fruit trees and plants as defined in claim 1 wherein said directional, directable microwave antenna is a paraboloidal reflector having an axis and a focal point in said axis, said focal point defined as the point of convergence of all rays of microwave power reflected from the concave side of said paraboloidal reflector when a beam of parallel microwave energy that is incident to said reflector and parallel with said axis, is directed toward it.

4. A microwave system for frost protection of fruit trees and plants as defined in claim 3, wherein said means for transmitting microwave energy from said source of microwave energy to said antenna is a waveguide, said waveguide configured as a tube of highly conductive metal, extending from said source of microwave energy to said focal point of said reflector, said waveguide terminated at said focal point in a horn, said horn facing the concave side of said reflector.

5. A microwave system for protection of fruit trees and plants as defined in claim 4 wherein said reflector, said source of microwave energy and said waveguide is a unitary assembly and wherein said means for directing said reflector is a sequencer, said sequencer consisting of:

means for rotating said unitary assembly of a reflector, a source of microwave power and a waveguide about a horizontal and about a vertical axis under control of a sequencer control apparatus.

6. A microwave system for frost protection of fruit trees and plants as defined in claim 5 wherein said means for rotating said unitary assembly of a reflector, a source of microwave power and a waveguide comprises two electric motors, two worm gears and two gearwheels combined to rotate said unitary assembly about a horizontal and a vertical axis.

7. A microwave system for frost protection of fruit trees and plants as defined in claim 6 wherein said sequencer control apparatus comprises two switches, one for each of said motors, each of said switches having a neutral position, an upper position for operating said motor in forward rotation and a lower position for operating said motor in its reverse rotation.

8. A microwave system for frost protection of fruit trees and plants as defined in claim 7, wherein said sequencer control apparatus further comprises means for automatically operating said switches to direct said antenna to pre-selected directions.

9. A microwave system for frost protection of fruit trees and plants as defined in claim 1 wherein said means for structural support of said directional, directable microwave antenna is a gantry consisting of vertical columns attached to the ground horizontal beam supporting said antenna in a generally downward facing position.

10. A microwave system for frost protection of fruit trees and plants as defined in claim 1 wherein said means for structural support of said directional, directable antenna is a mast, said mast at its lower end rigidly attached to the ground, and at its upper end supporting said means for directing said directional, directable antenna and said directional antenna.

11. A microwave system for frost protection of fruit trees and plants as defined in claim 1, wherein said means for structural support of said directional, directable antenna comprises:

a wheeled carriage;

an assembly of two articulated power-operated booms;

said booms mutually at one end pivotally attached to each other, and one boom at the other end pivotally attached to said wheeled carriage and the other boom at the other end attached to said means for directing said directional, directable antenna; and said means for directing said directional, directable antenna and said directional, directable antenna.

12. A microwave system for frost protection of trees and plants as defined in claim 6, wherein said reflector has the shape of a generally vertically oriented ellipsoid, thereby projecting a beam shaped like a spread fan disposed in a vertical plane.

13. A microwave system for frost protection of trees and plants as defined in claim 12, wherein said means for rotating said unitary assembly of a reflector, a source of microwave power and a waveguide further comprises means for controlling said rotation such that the beam is covering an area of land that is defined by two radii extending from said vertical axis of rotation in consecutive sweeps of the beam.

* * * * *